United States Patent [19]

Bondioli

[11] Patent Number: 4,687,367
[45] Date of Patent: Aug. 18, 1987

[54] DEVICE FOR MANEUVERING FAST CONNECTION TANGENTIAL BUTTON OPERATED OF SPLINED PROFILE CLUTCHES, ESPECIALLY ON END FORKS OF AGRICULTURE CARDANIC SHAFTS

[76] Inventor: Edi Bondioli, Via Gina Bianchi 18, 46029 Suzzara Mantova, Italy

[21] Appl. No.: 861,226

[22] Filed: May 8, 1986

[30] Foreign Application Priority Data

May 10, 1985 [IT] Italy ............................ 9406 A/85

[51] Int. Cl.[4] .................. B25G 3/18; F16B 21/00
[52] U.S. Cl. ................................ 403/322; 403/324; 403/359
[58] Field of Search ............... 403/324, 322, 359; 279/81, 97

[56] References Cited

U.S. PATENT DOCUMENTS

| 2,448,278 | 8/1948 | Ronning | 403/359 |
| 2,667,357 | 1/1954 | Andreasson | 279/81 |
| 2,731,273 | 1/1956 | Edens | 279/81 |

FOREIGN PATENT DOCUMENTS 937084 12/1955 Fed. Rep. of Germany ...... 403/322

Primary Examiner—Andrew V. Kundrat
Attorney, Agent, or Firm—McGlew and Tuttle

[57] ABSTRACT

Device for maneuvering a fast connection tangential button operated in the tranmissions having splined profile clutches or joints, comprising an annular member encircling the body of the joint and having an internal profile making up a thrust surface able to act on the button as a consequence of an angular displacement of the annular member around the joint body; the reaction spring acting on the button angularly urges said annular member in a direction opposite to that causing the release action upon the button.

3 Claims, 9 Drawing Figures

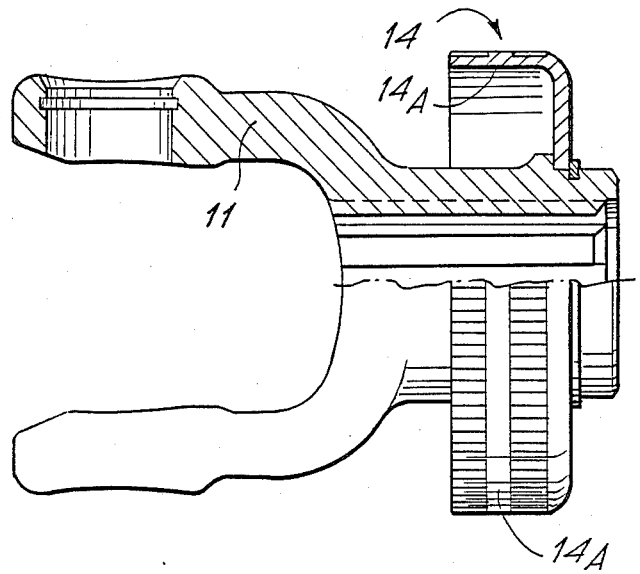
Fig. 4
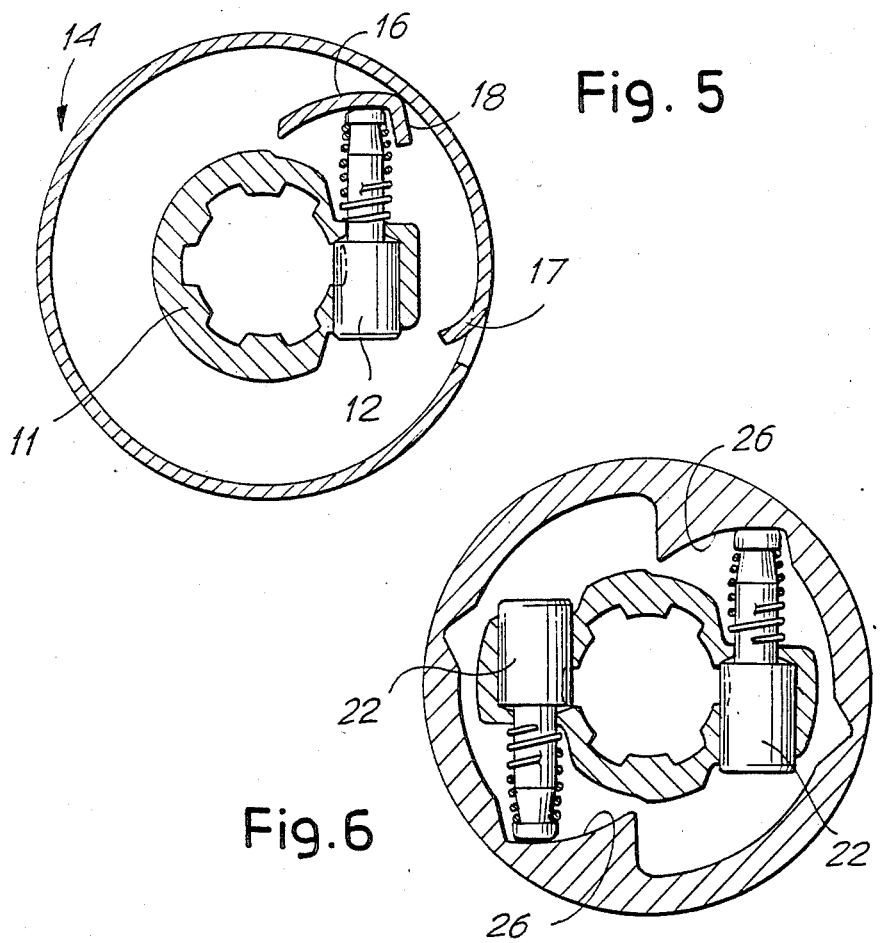
Fig. 5
Fig. 6

DEVICE FOR MANEUVERING FAST CONNECTION TANGENTIAL BUTTON OPERATED OF SPLINED PROFILE CLUTCHES, ESPECIALLY ON END FORKS OF AGRICULTURE CARDANIC SHAFTS

The object of the invention is to provide a manoeuvring device that can be applied to the fork provided with a fast, button-type connection for the coupling to a motion drive, through a suitable, easily achievable conformation of the hub of the same fork. The device facilitates the operative handlings and safeguards against accidental dangers due to the traditional button projection. These and other objects and advantages will become apparent to those skilled in the art from a reading of the following text.

Substantially, the manoeuvring device of the invention—which is provided for the fast, tangential button operated connection in the transmissions with splined profiles joint—comprises an annular member encircling the joint body and having an internal profile making up a thrust-surface able to act on the button as a consequence of an angular displacement of the annular member around the joint body.

The traditional reaction spring acting on the button angularly urges said annular member too in an opposite direction to the one causing the release action upon said button.

The cylindrical skirt has an internal annular extension which forms the rotation support on the joint body, the latter having a rotation seat with retaining banks, one of which being of mobile ring type.

In a feasible embodiment, the annular member has a cylindrical skirt with its profile being partly formed in the thickness and partly in an inner projection of the same skirt. In another possible embodiment, the annular member may be made of laminar material along with the flange-like extension.

The annular member may also, advantageously, form a stop to limit the travel of the angular release operation; this stop can be obtained through an inside notch in the cylindrical skirt or through a projection formed in the laminar material of the skirt or of the inner flange-like extension.

On the opposite side to the annular extension resting on the joint body, a guard may be provided, formed by a support wall arising from the joint body or from the skirt or partly from the body and partly from the skirt.

In case of several buttons on a same joint, several active profiles may be provided for the simultaneous control of the buttons.

According to a possible modified embodiment, two symmetrical active profiles may be provided in the annular member to achieve the possiblity of operating through two directions of angular displacement of the annular member; thus a same annular member can be used for driving buttons located according to a right or a left orientation.

The invention will be better understood by following the description and the accompanying drawing, which shows a practical, non limitative exemplification of the same invention. In the drawing.

Figure 1:
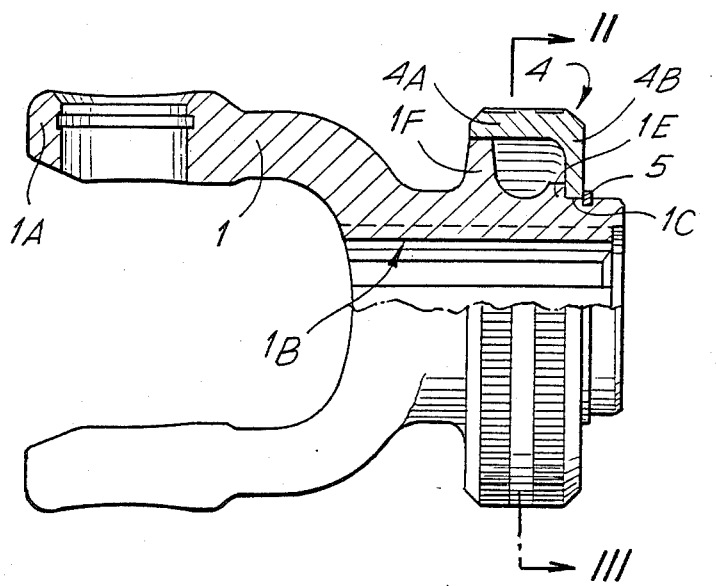
FIG. 1 is a partial elevational and partial sectional view of a fast connection button upgrade clutch constructed in accordance with the invention.
Figure 2:
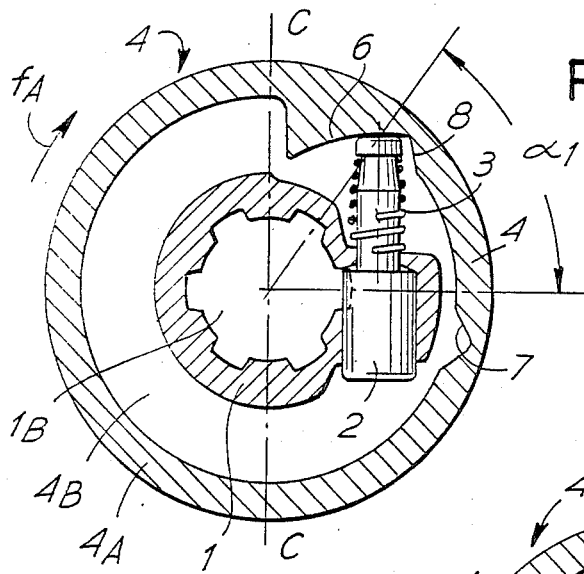
FIG. 2 is a section taken along the line roman numeral 2-3 FIG. 1.
Figure 3:
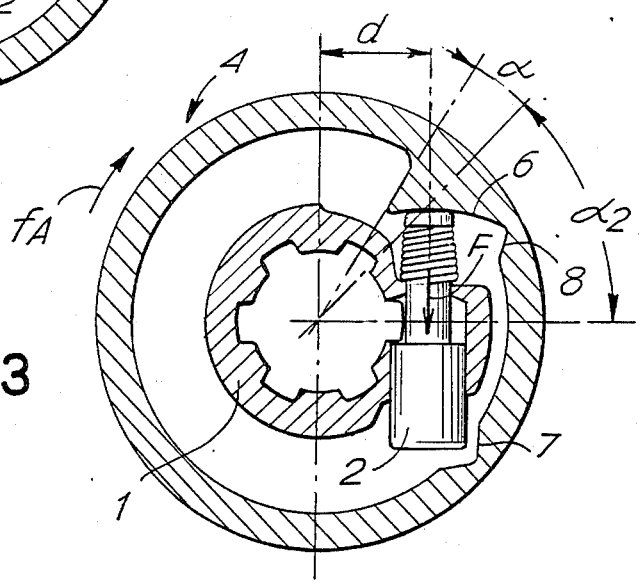
FIG. 3 is a view similar to FIG. 2 showing the parts in a released position.
Figure 7:
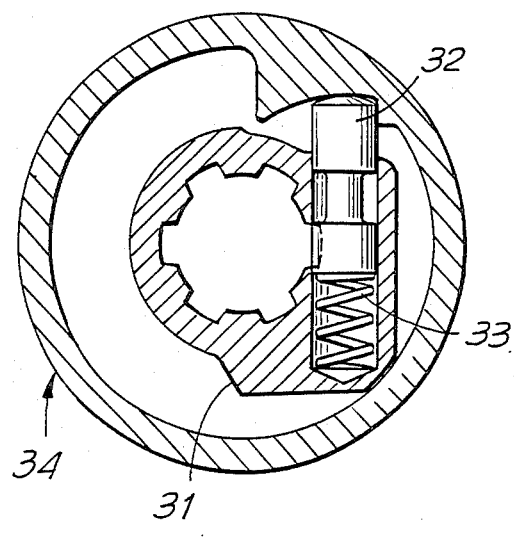
Figure 8:
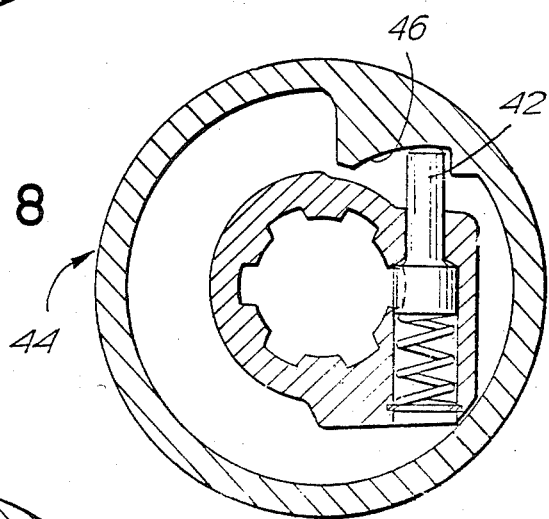
Figure 9:
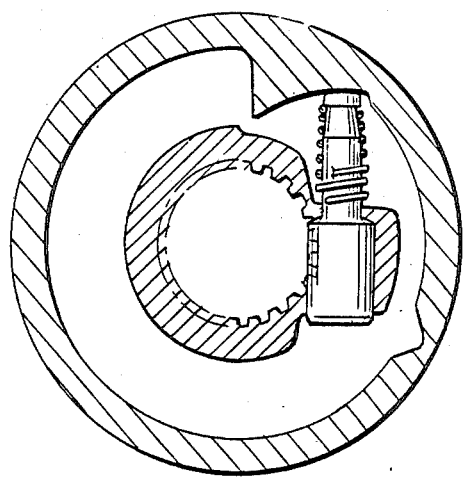

FIG. 4 the view similar to FIG. 1 of another embodiment advise;

FIGS. 5 and 6 are views similar to FIGS. 2 and 3 of the embodiment shown in FIG. 4;

FIGS. 7, 8 and 9 are views similar to FIG. 2 of other embodiments of the devise.

GENERAL DESCRIPTION OF THE PREFERRED EMBODIMENTS

According to FIGS. 1 to 3, numeral 1 indicates the body of fork 1A in which a hole 1B is formed, having a splined profile for the joint of the shaft to be axially blocked by a button 2 sliding in a tangential seat of the body 1 and extending into the hole 1B and engaged in an annular groove of the shaft. Numeral 3 indicates a biasing spring of the button 2, which urges the button 22 into a blocking position as shown in FIG. 2. By acting on the button 2 against the spring biasing action according to (FIG. 3) in the direction F the interference annulled and the shaft is released from the fork body.

To perform this operation, an annular member 4 is used which encircles the body 1 at the button zone and forms a manoeuvring sleeve or shell. This sleeve 4 has a cylindrical skirt portion 4A and an inner flange-like extension 4B, which rests on a rotation seat formed by the body 1, between a raised section 1E and an elastic ring 5 for the confinement of sleeve 4 on the fork.

The button 2 and the spring 3 may maintain the same configurations and sizes which they have on the normal end forks.

The operating sleeve 4 is guided within the surfaces 1C machined on the fork hub and is retained on one side by a shoulder 1E and on the other, by the elastic ring 5 housed in a seat formed by the guide surfaces 1C and the shoulder 1E.

On the opposite side to the internal extension or flange 4B, a projection 1F is provided, making up a support and closure wall; within certain limits, this wall can also be formed, in part, by the skirt 4A.

The manoeuvring member 4 has the outside part of circular form and such a width as to completely cover the portion of fork 1 engaged by the button 2. However during the rotation, no or projection is presented which could be a potential danger source for the operator.

In the inside, in correspondence of the head of button 2, the skirt 4A exhibits a length of cylindrical surface 6 having as a directrix curve an arc of circle involute making up the surface performing a thrust upon the button.

The rotation $\alpha = \alpha_1 - \alpha_2$ (FIGS. 2 and 3) of the annular member or sleeve 4 according to fA causes, owing to the contrast of the thrust surface 6 with the head of button 2, the sliding of the latter within its seat on the fork hub according to arrow F and against the action of spring 3. Accordingly, the interference configuration with the splined profile shown in FIG. 2 is changed into a non-interference configuration shown in FIG. 3. As soon as the annular member or sleeve 4 is released, under the action of the torque generated by the spring 3 contrasting the button 2, the sleeve is brought again to the initial position in the direction opposite to arrow fA and, at the same time, the button 2 takes up again the interference configuration with the splined profile 1B (FIG. 2). The rotation of the sleeve is thus the manoeuvre or handling operation which allows the coupling and release of the fork with and from the motion drive.

The outer surface of the skirt 4A may be knurled or otherwise worked to increase the grip during the handling operation. The same effect can be obtained by providing an external, slightly corrugated shape; such shape is useful whenever—for construction reasons related to the splined profile sizes—the overall dimensions reach such a value that the hand is no longer able to embrace it.

To limit the angular stroke of the annular member or sleeve 4, a stop 7 may be provided, which acts in the arrangement of FIG. 3, on the head of the button 2, which projects into the stop after the release is over.

FIGS. 1 to 3 show an end fork intended to engage motion drives rotating clockwise. In fact by such rotation, the occurrence of a resistance on sleeve 4 which might tend to brake it, does not cause the sliding of the button 2—and thus it is avoided that the positions of the parts for the release from the motion drive can be reached as shown in FIG. 3. It does effect only the contact of the head of the button 2 on a stop surface 8 (FIG. 2). For those forks destined to be engaged with anticlockwise motion drives, the sleeve and the hub must have a conformation symmetrical in respect to the C—C axis shown in FIG. 2; of course the operating principle of the apparatus remains unchanged.

The operating is not affected by the shape of the splined profile. Profiles with a great number of teeth or having great dimensions may require longer strokes of the button, which can be achieved by suitably extending the thrust surface 6 and, accordingly, increasing the sleeve diameter.

FIGS. 1 to 3 show an embodiment of the apparatus having a conformation in which the design of the fork 1 and the annular member 4 are suitable to produce a completely enclosed unit.

FIGS. 4 and 5 show the same apparatus in an open conformation which is well suitable to realize the shell through stamped plate. The reference numbers are the same used in FIGS. 1 to 3, but increased by "10". In this embodiment, the annular member 14 made up of plate may be provided with a profile 16 added thereto or formed through a shearing and a bending of the laminar material; the stops 17 and 18, which limit the angular travel, may also be obtained through a shearing and bending process.

In FIG. 6 an embodiment is shown with two buttons 22 with relevant springs 23, which are shaped and dimensioned according to the requirements of the profile, the fork size and the type of usage, without alteration of the operation and the handling capability. Obviously, the manoeuvre sleeve 4 carries at the inside as many thrust surfaces 26 as many are the buttons provided on the fork.

FIG. 7 shows a simplified embodiment of the button 32, in which the seat on the fork 31 is made up of a hole with only one diameter and the axial restraint of the button, against the action of the counteracting spring 33, is ensured by the same annular member 34.

FIG. 8 shows an embodiment in which the button 42 is of traditional and widely-spread shape, being different from that of FIGS. 1 to 3, and still manoeuvrable through an annular member 44 provided with a thrust surface 46 similarly to the preceding examples.

In FIG. 9, a similar solution is applied to a joint having a splined profile different from that of the preceding examples.

The thrust surface 6, 16, 26 etc. is preferably realized so as to cooperate with the button end in such a way that the thrust on same button shall be always axially directed, thereby obtaining a substantial nimbleness of operation.

It is understood that the drawing shows an exemplification given only as a practical demonstration of the invention as this may vary in the forms and dispositions without nevertheless departing from the scope of the idea on which the invention is based.

I claim:

1. A device for maneuvering a fast connection tangential button operated, in a transmission including a splined clutch, comprising a fork body having a radially extended arm, a button cylinder supported on said arm, said button cylinder being slightly inset in said arm and projecting out of said arm, an annular sleeve member encircling said fork body and having an inner profile making up a thrust surface able to act on said button cylinder as a consequence of an angular displacement of said annular member around said fork body, a biasing spring acting on said button cylinder urging said annular member in a direction opposite to that causing a release action on said button cylinder, said annular member forming a stop located so as to engage the terminal end of said button cylinder opposite from said thrust surface to limit the travel of said button cylinder, said annular member having a cylindrical skirt portion with an inner radial extension which makes up its rotation support on said fork body and having a rotation seat for said radial tension member; and a plate member in the form of a ring for retaining said radial extension member.

2. A device according to claim 1 wherein said annular member comprises a cylindrical laminar material skirt and an inner flange-like radial extension, said inner profile being formed through a shearing and a bending of the laminar material of said annular member.

3. A device according to claim 1 wherein the area opposite to said radial extension includes a guard made up of a support wall arising from the fork body and said cylindrical skirt portion.

* * * * *